United States Patent [19]

Bigelow

[11] 4,093,356
[45] June 6, 1978

[54] TRANSFLECTIVE LIQUID CRYSTAL DISPLAY

[75] Inventor: John E. Bigelow, Clifton Park, N.Y.

[73] Assignee: General Electric Company, Schenectady, N.Y.

[21] Appl. No.: 768,105

[22] Filed: Feb. 14, 1977

[51] Int. Cl.² .............................................. G02F 1/13
[52] U.S. Cl. .................................... 350/338; 350/347; 350/349; 350/157
[58] Field of Search ................... 350/160 LC, 150, 157

[56] References Cited

U.S. PATENT DOCUMENTS 3,748,018  7/1973  Borden, Jr. .................... 350/160 LC
3,900,248  8/1975  Nagasaki ...................... 350/160 LC Primary Examiner—Edward S. Bauer
Attorney, Agent, or Firm—Geoffrey H. Krauss; Joseph T. Cohen; Marvin Snyder

[57] ABSTRACT

A transflective liquid crystal display capable of presenting viewable indicia to an observer stationed to the front thereof, responsive to either reflection of incident ambient light entering into display from the front thereof or transmission of light from a source behind the display, utilizes a reflective display of the type having a twisted nematic liquid crystal host-guest dichroic dye cell backed by a quarter-wave plate and a partially-reflective, partially-transmissive transflector member, in conjunction with a linear polarizer and a second quarter-wave plate arranged between the back-lighting source and the partially-transmissive member.

6 Claims, 1 Drawing Figure

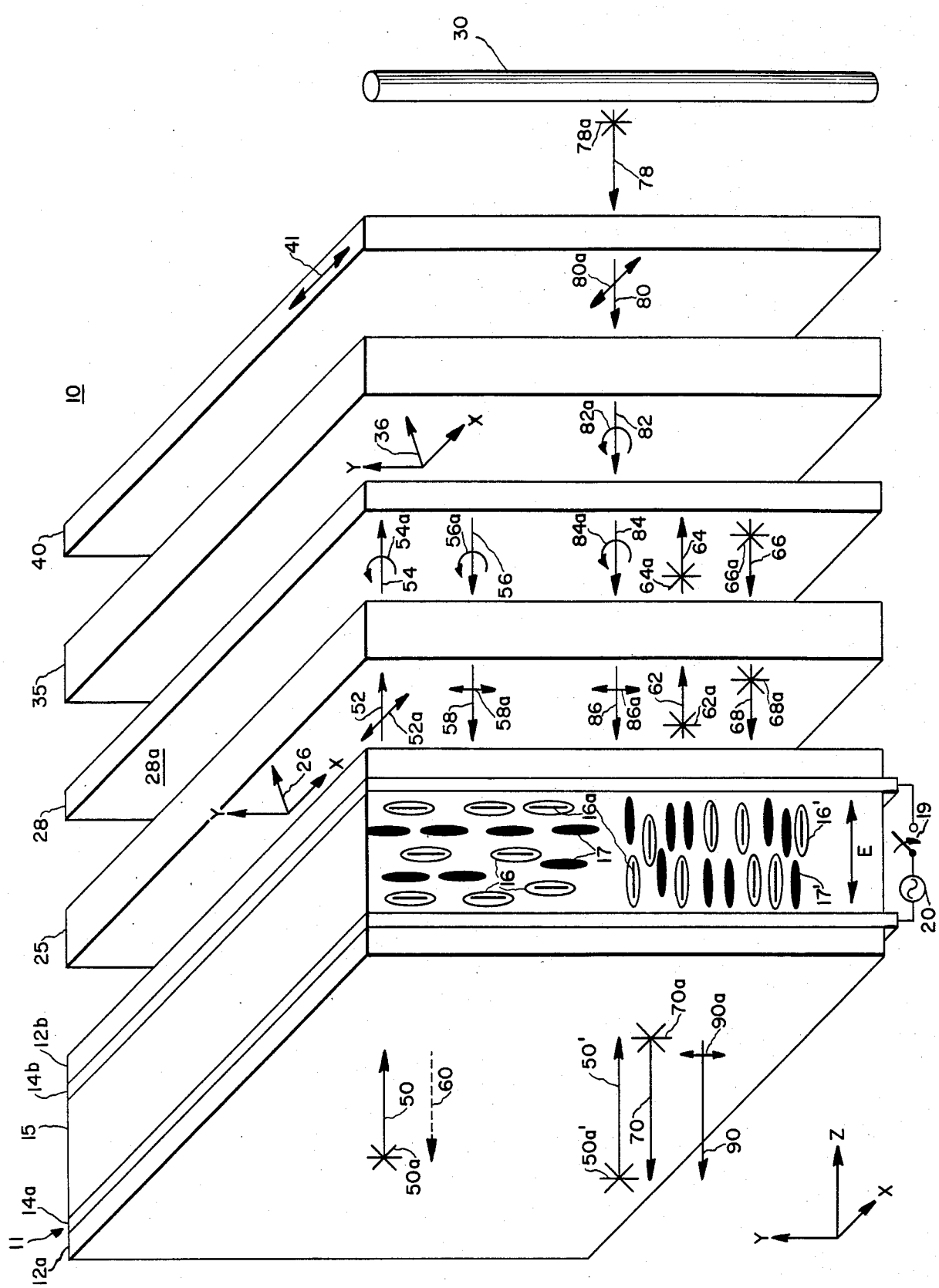

TRANSFLECTIVE LIQUID CRYSTAL DISPLAY

BACKGROUND OF THE INVENTION

The present invention relates to liquid crystal displays and, more particularly, to a novel liquid crystal display having a partially-transmissive reflective transflective member and means for imparting the proper polarization to unpolarized light from a source for transmission through the transflective member for lighting the display in low ambient light situations.

Known liquid crystal displays have the advantage of operating at low power levels and being visible in high ambient brightness environments. One such display typical of the type is disclosed in pending U.S. application No. 667,270, filed Mar. 15, 1976 and assigned to the assignee of the present invention and now abandoned. The "Reflective Dichoric Display" disclosed therein utilizes a liquid crystal cell of the twisted nematic type and having a suitable dichroic dye dissolved in a liquid crystal material. The cell linerarly polarizes incident unpolarized ambient light (in the quiescent state with a positive anisotropy liquid crystal material). The cell is backed by a quarter-wave plate and a reflective means, whereby light is absorbed in the display in a quiescent mode and is reflected by the display in an active mode. Proper operation a display of this type requires ambient light of sufficient magnitude to allow indicia, formed by the display, to be visible at the magnitude of light reflected by the display. In low ambient light situations, the magnitude of the somewhat attenuated reflected light is insufficient for normal viewing. A liquid crystal display having the desirable high contrast of such a liquid crystal display, but viewable in both high and low ambient lighting environments is desirable.

BRIEF SUMMARY OF THE INVENTION

In accordance with the invention, a transflective liquid crystal display utilizes a liquid crystal cell containing a twisted nematic liquid crystal material, preferably of the positive dielectric anisotropy type, acting a host for a guest dichroic dye material dissolved therein; a first quarter-wave plate arranged behind the cell and a partially-reflective, partially-transmissive (transflective) member behind the first quarter-wave plate for substantial reflection of ambient light entering through a front face of the cell and passing therethrough and thence through the quarter-wave plate to the transflective member. A light source behind the transflective means supplies unpolarized light in low ambient lighting situations; means for establishing a desired optical polarization of the light source output is positioned between the light source and the transflective means.

In a preferred embodiment, the optical polarization establishing means comprises a linear polarization and a second quarter-wave plate sequentially arranged between the light source and the transflective means, to impart a circular polarization to light passing through the transflective means to the first quarter-wave plate and the liquid crystal cell to obtain a transmissive display when the light source is activated, yet facilitate use of the display in a reflective mode in relatively bright ambient lighting situations.

Accordingly, it is an object of the present invention to provide a novel transflective liquid crystal display capable of being viewed in both relatively bright and relatively dim ambient lighting environments.

This and other objects of the present invention will become more apparent upon a consideration of the following detailed description and the drawing.

BRIEF DESCRIPTION OF THE DRAWING

The sole FIGURE is a perspective view of a transflective liquid crystal display in accordance with the principles of the present invention.

DETAILED DESCRIPTION OF THE INVENTION

Referring to the sole FIGURE, transflective display means 10 comprises a liquid crystal display cell 11 having a pair of substantially parallel, planar transparent substrate 12a and 12b spaced each from the other. Each substrate has a substantially transparent conductive electrode 14a and 14b, respectively, fabricated upon a facing interior surface thereof. A quantity 15 of a liquid crystal material fills the volume between spaced electrodes 14a and 14b. The liquid crystal composition comprises a liquid crystal material having elongated molecules 16, preferably of the positive dielectric anisotropy type, acting as a host for a molecule 17 of a guest dichroic dye material, as more fully described in the above-mentioned pending U.S. application, incorporated herein by reference.

In the quiescent mode, the elongated axis, or director, 16a of each liquid crystal molecule 16, and the elongated axis of dichroic dye molecules 17, are aligned parallel to the plane of substrates 12, i.e. parallel to a direction vector $\overline{Y}$. In the activated condition, repsonsive to generation of an electric field E between electrodes 14a and 14b by closure of a switch means 19 coupling an AC source 20 thereto, the liquid crystal molecules 16' are caused to turn with their director 16a parallel to the electric field, and cause dye molecules 17' to be aligned with their elongated axes substantially perpendicular to the interior facing surfaces of the electrodes, i.e. in the $\overline{Z}$ direction.

A first quarter-wave plate 25 is positioned substantially in abutment with the rear cell substrate 12b and has its fast axis 26 aligned at an angle essentially equal to 45° in a first direction relative to the direction ($\overline{Y}$) of the dye molecule axes in the quiescent mode. Thus, fast axis 26 forms the direction vector ($\overline{X}+\overline{Y}$). A partially-transmissive reflecting member 28 is positioned substantially in abutment with the surface of first quarter-wave plate 25 furthest removed from liquid crystal cell 11. The partially-reflective partially-transmissive, or transflective member 28 may be comprised preferably of a half silvered member of optically transparent material, such as glass and the like.

A light source 30, such as a "beta" light, i.e. a light source using radioactive decay for producing luminescence, is positioned beyond the rear surface, i.e. that surface furthest from the liquid crystal cell, of transflective member 28. A second quarter-wave plate 35 is positioned between light source 30 and transflective member 28, and substantially in abutment with the latter. The second quarter-wave plate 35 has its fast axis 36 also arranged substantially at a 45° angle with respect to the direction of the elongated axes of dye molecules 17 in a quiescent state, and in the same direction of rotation as the angle formed by the fast axis 26 of first quarter-wave plate 25. Thus, fast axis 36 also has a direction vector ($\overline{X}+\overline{Y}$) and is essentially parallel to the direction vector of fast axis 26. A means 40 for linearly polarizing light is positioned between light source 30 and second quarter-wave plate 35, and has its linear polarization vector 41 arranged perpendicular to the quiescent-mode axial alignment of dichroic dye molecules 17, i.e., in the $\overline{X}$ direction in the illustrated embodiment.

In the reflective mode of operation, a beam 50 of ambient, unpolarized light has random polarization vectors 50a. Beam 50 impinges upon front substrate 12a of liquid crystal cell 11 and is transmitted through the substantially transparent front substrate and front electrode 14a. Transmission of incident light through the quiescent cell, having dye molecules axes 17 aligned in the $\overline{Y}$ direction, causes light to be absorbed in the direction of the dye axes, so that the beam 52, emerging from the rear substrate 12b of the cell, is substantially linearly polarized with polarization vector 52a in the $\overline{X}$ direction. The essentially $\overline{X}$-polarized light beam 52 is transmitted through first quarter-wave plate 25 to emerge as a beam 54 of light having circular polarization, with (for the indicated alignment of fast axis 26) a counter-clockwise polarization vector 54a, as viewed from the source of the beam and in the direction of propagation ($+\overline{Z}$). Thus, beam 54 is said to be left-handedly circular polarized. Beam 54 is reflected by front surface 28a of the transflective member to be returned towards first quarter-wave plate 25 as a beam 56 of light having circular polarization of the opposite handedness, i.e. a right-handed circular polarization vector 56a, causing the beam to have a clockwise polarization vector when viewed in the direction of propagation ($-\overline{Z}$ direction). Upon transmission through first quarter-wave plate 25, a beam 58 of light emerges therefrom toward rear substrate 12b of display cell 11, which beam has a linear polarization vector 58a in the $\overline{Y}$ direction. Beam 58 enters the liquid crystal cell and, as its polarization vector is parallel to the elongated axis of dye molecule 17, is essentially absorbed therein, whereby a "beam" 60 of light of substantially zero magnitude appears to be reflected from substrate 12a of the cell towards an observer stationed to the left of the cell as seen in the drawing.

Upon closure of switch 19 and establishment of electric field E in the cell, the incident beam 50' of light, being essentially unpolarized with random polarization vectors 58a', encounters the dye molecules 17' on end and is essentially transmitted through the cell without absorption to emerge as a beam 62 of light still having essentially random polarization vectors 62a. The random polarization of beam 62 entering first quarter-wave plate 25 causes a beam 64 of light to emerge therefrom toward transflective member 28, which emerging beam is essentially unpolarized, as indicated by random polarization vectors 64a. Beam 64 is reflected from transflective member 28 as a beam 66 of light still having random polarization vectors 66a, which random polarization is maintained after transmission in the reverse direction through first quarter-wave plate 25, to emerge as a beam 68 of light with random polarization vectors 68a. As beam 68 is incident upon the ends of dichroic dye molecules 17', the beam passes through cell 11 in essentially undisturbed manner to emerge from the front surface of front substrate 12a as a beam 70 of unpolarized light, as indicated by polarization vector 70a. Thus, in the active (field-applied) mode, ambient light is reflected by the display to be visible to an observer stationed to the front thereof, while in the quiescent mode, ambient light is essentially absorbed within the display.

In environments where the magnitude of ambient light is insufficient to cause a visibly discernable reflection, light source 30, either of the continuously-emitting type or caused to emit in selective manner, provides a beam 78 of essentially unpolarized light, as indicated by random polarization vector 78a. Beam 78 is transmitted through polarizing means 40 to emerge therefrom as a beam 80 of light having linear polarization with its polarization vector 80a parallel to the polarization vector 41 of the polarizing means, i.e. in the $\overline{X}$ direction. Linearly polarized beam 80 is transmitted through second quarter-wave plate 35 to emerge therefrom as a beam 82 of light having circular polarization with a clockwise circular (right-handed) polarization vector 82a, due to the position of second quarter-wave plate fast axis 36. The circularly polarized beam 82 passes through transflective member 28 to emerge therefrom as a beam 84 of light still having a clockwise circular (right-handed) polarization vector 84a. The beam impinges on the rear surface of first quarter-wave plate 25 and is transmitted therethrough to emerge as a beam 86 of linearly polarized light having a polarization vector 86a essentially in the $\overline{Y}$ direction.

If the display is enabled to its quiescent mode, beam 86 encounters the same substantial attenuation within dye molecules 17 as hereinabove described for beam 58, also having linear polarization essentially in the Y direction, whereby substantially no light emerges as a "beam" 60 from the front face of the display and the display is not visibly discernable by an observer. If the cell is enabled to its active condition, transmitted linearly-polarized beam 86 encounters dye molecules 17' in the end-on conditions, as previously described for reflected beam 68, and is passed substantially unattenuated therethrough to emerge from the front of the display as a beam 90 having linear polarization with its polarization vector 90a still aligned in the Y direction.

Thus, the display, for the preferred liquid crystal material having a positive dielectric anisotropy, appears dark or extinguished in the quiescent condition and appears bright in the active condition, regardless of whether the viewable light is reflected ambient light or transmitted luminence from the rear-positioned light source 30. If a dichroic dye having a high order parameter is utilized, a high contrast display results, even though the brightness thereof is somewhat less in the transmissive condition, due to attenuation by polarizer means 40; this loss of brightness is relatively unimportant to an observer, as the transmitted-light mode is normally utilized only when the available light in the ambient environment is low, whereby any light transmitted through the display is of relatively greater magnitude than ambient light.

While the present invention has been described with reference to one preferred embodiment thereof, many variations and modifications will now occur to those skilled in the art. It is my intention, therefore, to be limited not by the present disclosure herein, but only by the scope of the appending claims.

What is claimed is:

1. A transflective liquid crystal display capable of producing observable indicia responsive to substantially unpolarized light entering from the front or the rear of the display, comprises:

a liquid crystal cell switchable between first and second light transmissive conditions, the first transmissive condition causing substantial absorption of light having a polarization vector in a first direction, the second condition allowing transmission of light through said cell with substantially no attenuation thereof;

a first quarter-wave plate adjacent the rear of said cell and having an optical axis positioned substantially at a 45° angle with respect to said first direction;

a transflective member arranged adjacent said first quarter wave-plate and opposite said cell;

a second quarter-wave plate arranged upon the opposite side of said transflective member from said first quarter-wave plate, said second quarter-wave plate having an optical axis disposed essentially parallel to the optical axis of said first quarter-wave plate; and means positioned adjacent said second quarter-wave plate opposite said transflective member for polarizing substantially unpolarized light in said first direction.

2. The transflective display of claim 1, wherein said transflective member is a half-silvered mirror.

3. The transflective display of claim 1, wherein said polarizing means is a sheet of polarizing material positioned parallel to said transflective means.

4. The transflective display of claim 1, wherein said liquid crystal display cell comprises a pair of spaced, substantially parallel electrodes; a quantity of a liquid crystal material filling the volume between the electrodes; and a quantity of a dichroic dye material dissolved in the liquid crystal material.

5. The transflective display of claim 4, wherein the liquid crystal material has a positive dielectric anisotropy.

6. The transflective display of claim 1, further comprising means positioned beyond said polarizing means for emitting light at least toward said polarizing means.

* * * * *